United States Patent
Coderre

[11] 3,889,705
[45] June 17, 1975

[54] HYDRAULIC SYSTEM RESERVOIR HAVING SEPARATE OIL AND AIR-OIL CHAMBERS

[75] Inventor: Curtis M. Coderre, Torrance, Calif.

[73] Assignee: Northrop Corporation, Los Angeles, Calif.

[22] Filed: Aug. 30, 1973

[21] Appl. No.: 393,219

[52] U.S. Cl. ............. 137/171; 137/207; 137/574; 137/577
[51] Int. Cl. ............................................. F16l 55/04
[58] Field of Search .......... 137/571, 572, 574, 575, 137/576, 577, 578, 593, 207, 43, 171; 138/26; 220/20.5

[56] References Cited
UNITED STATES PATENTS

| | | | |
|---|---|---|---|
| 2,679,333 | 5/1954 | Starck | 137/578 X |
| 2,707,033 | 4/1955 | Moerke et al. | 138/26 |
| 2,871,870 | 2/1959 | Peters | 137/207 |
| 2,925,823 | 2/1960 | Schirmer et al. | 137/171 |
| 3,148,745 | 9/1964 | Jones | 137/207 X |
| 3,292,661 | 12/1966 | Everett | 137/207 X |
| 3,477,611 | 11/1969 | Niles | 220/44 R X |
| 3,612,083 | 10/1971 | Kronk | 137/576 X |

FOREIGN PATENTS OR APPLICATIONS

| | | | |
|---|---|---|---|
| 921,116 | 4/1947 | France | 137/43 |

*Primary Examiner*—Alan Cohan
*Assistant Examiner*—Gerald A. Michalsky
*Attorney, Agent, or Firm*—William W. Rundle; Willard M. Graham

[57] ABSTRACT

A reservoir for oil wherein there is only a limited area of air to oil interface such that vortexing of oil at high flow rates does not mix air with inlet oil. The reservoir has an internal separator such that there are two chambers; one chamber normally contains oil and an air volume for system expansion and is pressurized by an external air source. The other chamber normally is completely filled with oil. Connecting the two chambers is a transfer tube which functions in part to scavenge air from the second mentioned chamber. The pressurized air in the first mentioned chamber pressurizes both chambers due to the transfer tube.

6 Claims, 5 Drawing Figures

PATENTED JUN 17 1975

SHEET 1

3,889,705

HYDRAULIC SYSTEM RESERVOIR HAVING SEPARATE OIL AND AIR-OIL CHAMBERS

BACKGROUND OF THE INVENTION

The invention herein described was made in the course of Contract No. F33657-69-C-0150 with the United States Air Force.

This invention relates to a liquid supply and storage tank, and more particularly to an improved tank reservoir for aircraft wherein there is a limited area of air-to-oil-interface such that aircraft maneuvers and vortexing of oil at high flow rates do not mix air with pump inlet oil coming from the reservoir.

Aircraft oil and fluid reservoirs in present use are generally of a non-separated air/oil type in which air is free to mix with oil when the aircraft is subjected to zero gravity conditions, such as occurs in flight maneuvering at $g$ values of zero or negative values, which happens quite often with maneuverable aircraft such as trainers or fighters. Under zero or negative $g$ flight (particularly zero $g$ flight which occurs during push-overs and other maneuvers), large globules of air from the reservoir chamber are sucked into the hydraulic control system. This reduces hydraulic pressure temporarily which could be at a critical time, and depending on how much air is ingested, could take appreciable time to scavenge and build the hydraulic pressure up to normal.

BRIEF SUMMARY OF THE INVENTION

My invention is a two chambered reservoir comprised of a shell divided internally by a baffle or partition whereby an upper chamber, with respect to an aircraft in normal level flight position, is a main oil chamber, in which an oil intake and outlet are located. The other is an air-oil chamber containing pressurized air and "make-up" oil which, through a transfer tube that operates in both directions automatically depending on whether the main oil chamber is over or underfilled, insures that the main oil chamber is kept full of oil and prevents air from being ingested into the hydraulic system through the reservoir outlet.

Should a small amount of air appear in the main oil chamber, for any reason, it will rise to a convex portion in the top of the main oil chamber and be scavenged by the transfer tube.

It is an objective of the present invention to purge a pressurized hydraulic system of even small air bubbles and thereby prevent air ingestion into the hydraulic system.

Another object is to provide an unvented pressurized reservoir that operates with optimum results with a minimum of oil, at any altitude, position or $g$ values.

Another object is to provide a reservoir that automatically provides for system oil expansion and system oil leakage.

Other objectives and structural details of the present invention will appear from the following description when read in connection with the accompanying drawings, wherein:

DETAILED DESCRIPTION OF INVENTION

Figure 1:
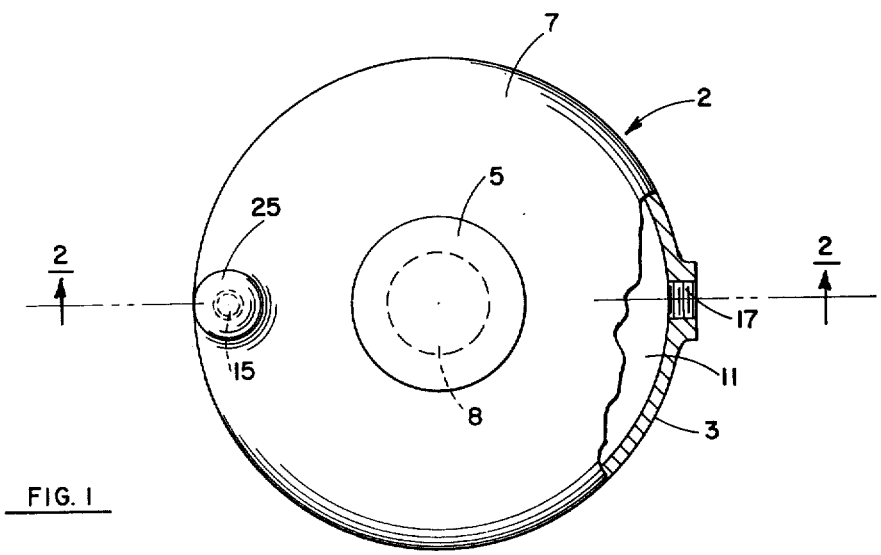
FIG. 1 is a top view, partly cut away, of the reservoir of the present invention.

Referring to the drawings, a reservoir in accordance with the illustrated embodiment of the present invention is adapted for use in aircraft to contain oil for supplying the need of a hydraulic system. It offers simplicity of design and maintenance, ease of filling and is conservative of airframe installation space.

Figure 2:
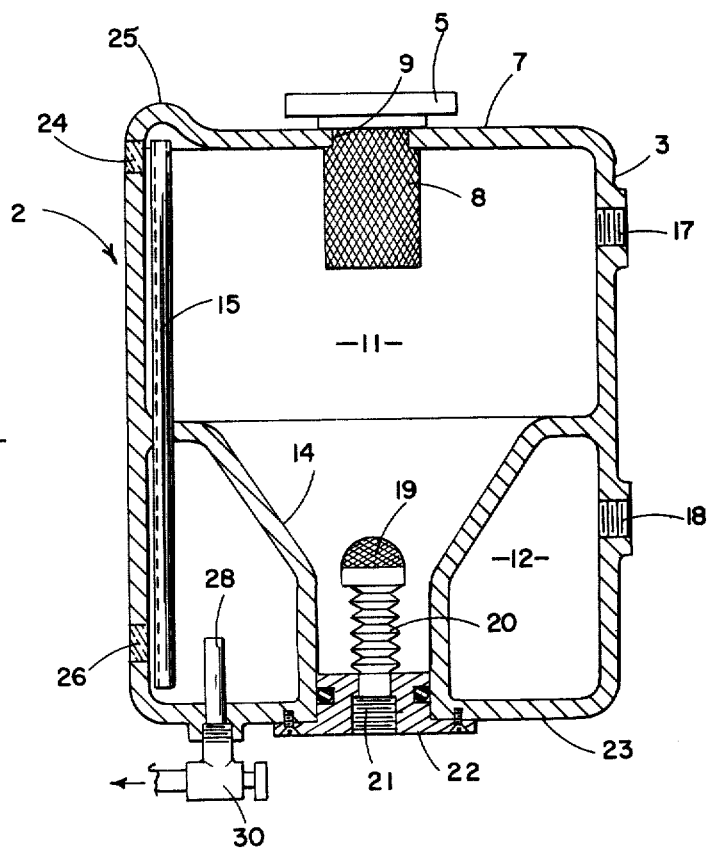
FIG. 2 is a cross section, taken substantially along line 2—2 of FIG. 1.

Referring now to FIGS. 1 and 2, a shell 3 provides a generally cylindrical side wall body portion of the present reservoir 2. An unvented filler cap 5 seals an aperture 9 in an end wall forming a top 7 of the reservoir 2, and is removed only during the filling operation.

FIG. 2 shows a filter 8 which is fixed in the aperture 9, located in the top 7. The reservoir 2 is divided into a main oil chamber 11 and an air-oil chamber 12 by a tapered tubular separator or baffle 14 shaped as shown. The chambers 11 and 12 are interconnected by a transfer tube 15 for communication between the chambers 11 and 12.

The reservoir may be of welded and cast construction for example. The separator 14 may be fixed in the reservoir and tapers inwardly and downwardly to another end wall forming meet the bottom 23 of the reservoir. The large extremity of the baffle 14 merges with an intermediate region of the cylindrical side wall of shell 3, and the small extremity merges with an intermediate region of bottom 23, as shown. Transfer tube 15 is preferably welded to the separator 14 near the outer edge of the reservoir and reaches nearly to the top and bottom thereof.

An inlet port 17 is provided in the main oil chamber 11 for system return oil entering the reservoir 2 and a pressure port 18 is provided in air-oil chamber 12 for application of air pressure from an external source.

Oil to the hydraulic system travels through a perforated or porous head 19, then through an expansible pick-up bellows 20 and exits through a system supply port 21 located in a reservoir plug 22. The reservoir plug 22 is removably attached to the bottom 23 of the shell 3, thereby allowing the porous head 19 to be removed and cleaned and/or replacement of the extendable pick-up bellows 20.

The porous head 19 is fixed to the inner (free) end of the expansible pick-up bellows 20 and is of sufficient weight to expand the pick-up bellows 20 when the reservoir 2 is required to operate in an inverted or rotated position. The other end of the pick-up bellows 20 is fixed to the reservoir plug 22.

An upper window 24 is provided in the upper part of shell 3 and looks into a convexed dome section 25 formed in top 7 immediately over the transfer tube 15. The window 24 is used as a means of visually determining if the main oil chamber 11 is full of oil at any given time. A lower window 26 is provided in the lower part of shell 3 and is used to determine if the oil in air-oil chamber 12 is at its normal level at any given time.

A standpipe 28 is removably attached through the bottom 23. The inner end of the standpipe 28 extends into the air-oil chamber 12; the outer end is connected to an external standard shut-off valve 30, which is opened during the reservoir filling operation.

Figure 3:
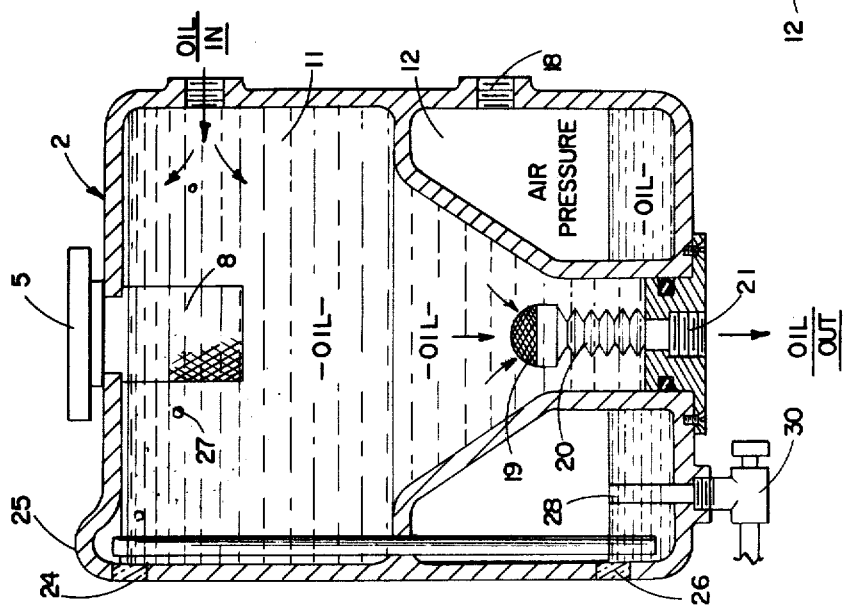
FIG. 3 is a view similar to FIG. 2 and showing the reservoir full of oil as it would be in normal operation.

Referring to FIG. 3, in the reservoir filling operation, the filler cap 5 is removed and standard valve 30 is opened. Oil is then poured through the filter 8 until the main oil chamber 11 is completely full, and oil from the air-oil chamber 12 filling through transfer tube 15 comes through standard valve 30. Filling is stopped and valve 30 is then closed and the cap 5 replaced. The reservoir 2 is now filled to its normal operating level as shown in FIG. 3. The height of standpipe 28 obviously governs the volume of oil in air-oil chamber 12. Air under desired pressure can now be introduced at pressure port 18.

Figure 4:
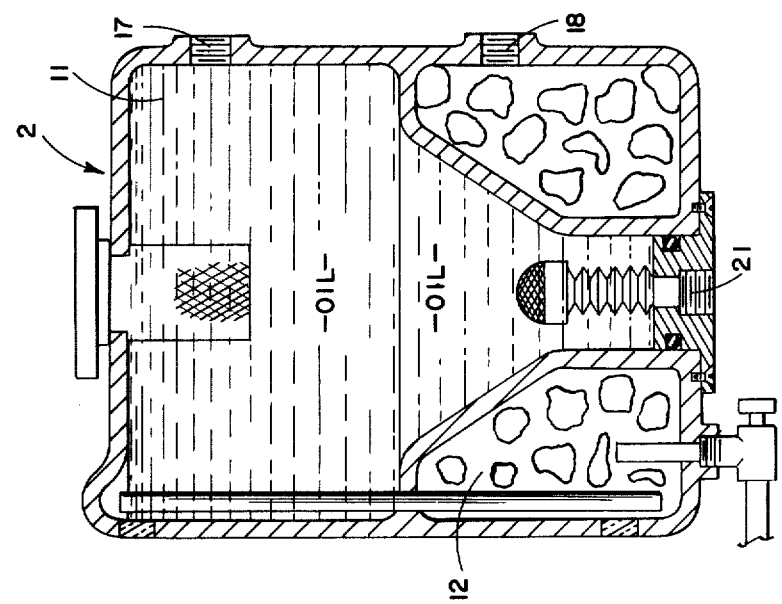
FIG. 4 is a view similar to FIG. 2 and showing the full reservoir in zero $g$ flight condition.

FIG. 4 shows the reservoir 2 as it operates at zero g condition. The main oil chamber 11 remains full of oil and the air-oil chamber 12 has oil "floating." The air in air-oil chamber 12 does not escape through system supply port 21 into the hydraulic system (not shown) and therefore has no deleterious effect on system performance.

Figure 5:
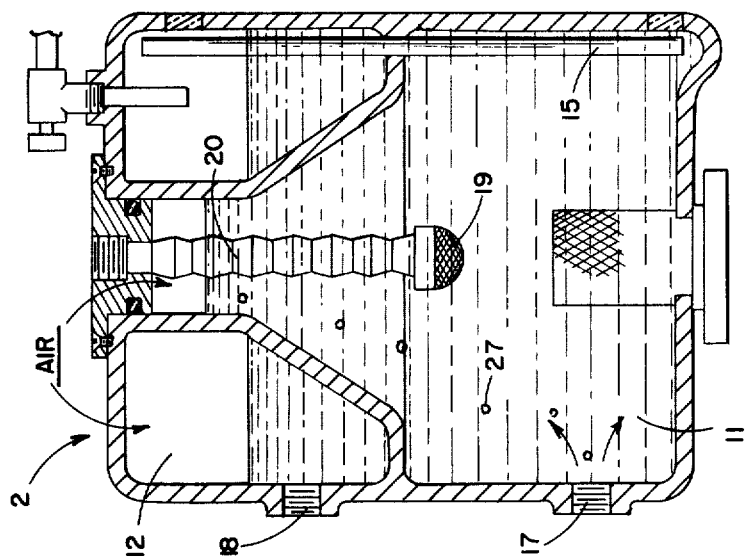
FIG. 5 is a view similar to FIG. 2 and showing the full reservoir in an inverted flight condition.

FIG. 5 shows the reservoir 2 as it operates in the inverted position. The main oil chamber 11 normally remains almost completely full of oil, and the air in the air-oil chamber 12 ascends to the bottom of air-oil chamber 12. Pick-up bellows 20 is extended due to the weight of head 19 and in the event that any air is trapped in the hydraulic system (not shown), this air 27 is released into the main oil chamber 11. It will ascend to the bottom of upper chamber 11, in contact with plug 22, will not be mixed with oil flowing into head 19, and will be scavenged from the main oil chamber 11 into air-oil chamber 12 by transfer tube 15 once the reservoir is returned to its normal upright operating position.

MODE OF OPERATION OF INVENTION

In operation the main oil chamber 11 is filled with oil and the air-oil chamber 12 contains both air and oil, as shown in FIG. 3. The air in the air-oil chamber 12 is connected to an external air pressure source (not shown) and thus pressurizes the air-oil chamber 12 oil directly and pressurizes the main oil chamber 11 oil by action of air-oil chamber 12 oil through transfer tube 15.

The air-oil chamber 12 volume provides for system oil expansion, system leakage, system differential volume, and required air volume.

Oil to the system's pump (not shown) travels through the porous head 19 and the extendable pick-up bellows 20 and exits at the bottom of main oil chamber 11 through reservoir outlet port 21. Oil return to the reservoir is through inlet port 17 located in main oil chamber 11.

When oil exiting is greater than the oil returning, such as in the case of operating cylinders with differential piston area, make-up oil is transferred from the air-oil chamber 12 to main oil chamber 11 through the transfer tube 15. When oil exiting is less than oil returning, oil will be transferred from the main oil chamber 11 to the air-oil chamber 12, again through the transfer tube 15. In this case, any air 27 that has entered the main oil chamber 11 will be scavenged from the upper chamber 11 and placed in the air-oil chamber 12 by the transfer tube 15 because of the location of the upper end of tube 15 at convexed section 25.

It will be seen that the limited area of air to oil interface referred to in the introduction is brought about by the smaller oil surface area in the air-oil chamber 12 than it would be in the main oil chamber 11, and is also due to the fact that there is essentially no air in the main oil chamber 11 during normal system operation.

I have thus described and illustrated an embodiment of my invention. It will be understood that various modifications may be made within the scope of the appended claims without departing from the spirit of the invention.

What is claimed is:

1. A reservoir for use in a closed loop aircraft hydraulic system wherein liquid is drawn from the reservoir and returned thereto for storage and re-use, comprising:
   a. a shell having a pair of opposite end walls with a side wall therebetween, one of said end walls being at the top of said reservoir and the other end wall at the bottom when said reservoir is used in an aircraft in normal level flight;
   b. baffle means extending from an intermediate region of said side wall to an intermediate region of said other end wall for dividing said shell into a main oil chamber for oil storage and re-use and an air-oil chamber for air collection and make-up oil;
   c. said main oil chamber having an oil outlet adjacent to said other end wall and having an oil inlet remote from said outlet, said outlet having hollow expansible bellows means extending therefrom into said main oil chamber toward said one end wall, with a free end provided with a perforated head having sufficient weight to expand said bellows means when said reservoir is rotated toward an inverted position;
   d. said air-oil chamber having an air pressurization inlet;
   e. and a transfer tube interconnecting said chambers and having opposite ends adjacent to said end walls, respectively.

2. A reservoir in accordance with claim 1, wherein said baffle means comprises a tapered tube having a large extremity merging with said side wall and a small extremity merging with said intermediate region of said other end wall, in which said oil outlet is formed, said air-oil chamber being defined between said baffle means and portions of said side wall and said other end wall.

3. A reservoir in accordance with claim 2, wherein said other end wall has a removable plug portion through which said outlet is formed.

4. A reservoir in accordance with claim 1, wherein said one end wall has a dome portion adjacent to the end of said transfer tube in said main oil chamber.

5. A reservoir in accordance with claim 1, further comprising a standpipe extending through said other end wall and having an open end in said air-oil chamber for governing the depth of liquid in said air-oil chamber when said reservoir is being filled for operation, said standpipe including shut-off valve means externally of said reservoir.

6. A reservoir in accordance with claim 5, further including a first sight window in said main oil chamber adjacent to one end of said transfer tube, and a second sight window in said air-oil chamber adjacent to said open end of said standpipe.

* * * * *